(12) United States Patent
Zhu

(10) Patent No.: US 7,885,278 B2
(45) Date of Patent: Feb. 8, 2011

(54) METHOD AND SYSTEM FOR CONNECTING A MEDIA STREAM, AND METHOD AND SYSTEM FOR DETECTING A CONNECTIVITY

(75) Inventor: Ning Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 12/362,270

(22) Filed: Jan. 29, 2009

(65) Prior Publication Data
US 2009/0135842 A1 May 28, 2009

Related U.S. Application Data

(63) Continuation of application No. PCT/CN2007/070372, filed on Jul. 27, 2007.

(30) Foreign Application Priority Data

Aug. 2, 2006 (CN) .................. 2006 1 0109508
Jan. 23, 2007 (CN) .................. 2007 1 0000300

(51) Int. Cl.
H04B 7/005 (2006.01)
H04B 1/44 (2006.01)
H04L 12/28 (2006.01)
H04L 12/56 (2006.01)
G06F 9/26 (2006.01)

(52) U.S. Cl. .................. 370/401; 370/278; 370/282; 711/202

(58) Field of Classification Search ............ 370/277, 370/278, 282, 401; 711/202
See application file for complete search history.

(56) References Cited

U.S. PATENT DOCUMENTS 7,146,410 B1 * 12/2006 Akman ............... 709/220

2002/0023143 A1 * 2/2002 Stephenson et al. ......... 709/218
2002/0083175 A1 * 6/2002 Afek et al. .................. 709/225

(Continued)

FOREIGN PATENT DOCUMENTS

CN 1267432 A 9/2000

(Continued)

OTHER PUBLICATIONS

Rosenberg et al., "SIP Traversal Through Residential and Enterprise NATs and Firewalls," *Internet Engineering Task Force (IETF)*, Internet Draft: 1-22 (Mar. 2, 2001) http://draft-rosenberg-sip-entfw-01.txt.

(Continued)

*Primary Examiner*—Ronald Abelson
(74) *Attorney, Agent, or Firm*—Leydig, Voit & Mayer, Ltd.

(57) ABSTRACT

This invention discloses a method for connecting a media stream, which includes: transmitting, by a media gateway in a private network, a connecting message to an external network device through a network address translation device; the connecting message is used for generating a new address mapping, which is used for a subsequent media stream to pass through the network address translation device, in the network address translation device when there is no address mapping available in the network address translation device; and the connecting message is used for keeping alive an address mapping when the address mapping is already available in the network address translation device. The invention further discloses a system for connecting a media stream, two methods for detecting connectivity, and a system for detecting connectivity.

23 Claims, 4 Drawing Sheets

U.S. PATENT DOCUMENTS

| | | | |
|---|---|---|---|
| 2003/0009561 | A1 | 1/2003 | Sollee |
| 2004/0246958 | A1 | 12/2004 | Lee et al. |
| 2006/0146870 | A1* | 7/2006 | Harvey et al. ............... 370/466 |
| 2007/0094412 | A1 | 4/2007 | Sollee |
| 2007/0192508 | A1 | 8/2007 | Sollee |
| 2007/0217407 | A1 | 9/2007 | Yuan et al. |
| 2008/0022014 | A1* | 1/2008 | Peters et al. ................. 709/246 |
| 2009/0129398 | A1* | 5/2009 | Riegel et al. ................. 370/401 |

FOREIGN PATENT DOCUMENTS

| | | | |
|---|---|---|---|
| CN | 1474538 A | | 2/2004 |
| CN | 1516409 A | | 7/2004 |
| CN | 1633102 A | | 6/2005 |
| EP | 1 921 823 A1 | | 5/2008 |
| WO | WO 02/103981 A2 | | 12/2002 |
| WO | 9859504 A1 | | 12/2008 |

OTHER PUBLICATIONS

State Intellectual Property Office of the People's Republic of China, International Preliminary Report on Patentability & Written Opinion of the International Searching Authority in International Patent Application No. PCT/CN2007/070372 (Feb. 3, 2009 and Nov. 1, 2007).

State Intellectual Property Office of the People's Republic of China, Examination Report in Chinese Patent Application No. 200710000300X (Apr. 3, 2009).

State Intellectual Property Office of the People's Republic of China, Examination Report in Chinese Patent Application No. 200710000300X (Mar. 11, 2010).

State Intellectual Property Office of the People'S Republic of China, Written Opinion of the International Searching Authority in Application No. PCT/CN2007/070331 (Oct. 19, 2007).

"Gateway Control Protocol: IP NAPT traversal package—Series H Audiovisual and Multimedia Systems—Infrastructure of audiovisual services—Communication procedures," Sep. 2005, International Telecommunication Union, Geneva, Switzerland.

Office action in corresponding Russian Patent Application No. 2009107159/09(009574), dated Jun. 29, 2010, from the Russian Patent Office, Moscow.

* cited by examiner

METHOD AND SYSTEM FOR CONNECTING A MEDIA STREAM, AND METHOD AND SYSTEM FOR DETECTING A CONNECTIVITY

CROSS-REFERENCE TO RELATED APPLICATIONS

This application is a continuation of International Patent Application No. PCT/CN2007/070372, filed Jul. 27, 2007, which claims priority to Chinese Patent Application No. 200610109508.0, filed Aug. 2, 2006 and Chinese Patent Application No. 200710000300.X, filed Jan. 23, 2007, all of which are hereby incorporated by reference in their entirety.

FIELD OF THE INVENTION

The present invention relates to the field of communication technologies, and in particular to a method and system for connecting a media stream, and a method and system for detecting connectivity.

BACKGROUND OF THE INVENTION

The Next Generation Network (NGN) indicates the coming of the age of new generation telecommunication networks. The NGN emerges from the integration of a Time Division Multiplex (TDM) based Public Switched Telephone Network (PSTN) voice network and an Internet Protocol/Asynchronous Transfer Mode (IP/ATM) based packet network, and makes it possible to implement integrated services of audio, video, data and the like over the new generation network.

A schematic structural diagram of the existing NGN network is as illustrated in FIG. 1. A Media Gateway (MG) is used to convert a media stream in a certain type of network to a format required in another type of network. For example, an E1 timeslot in a circuit switched network is converted to a Real-time Transport Protocol (RTP) media stream in an IP network. A Media Gateway Controller (MGC) is used to manage call status and to control bearer resources of the media gateway. A control signal is transmitted between the MGC and the MG, so that the MG can implement establishment, modification and release of a specific media stream, as well as resource management.

In FIG. 1, if bearer networks where the MG1 and the MG2 are located belong to the same private or public network, all IP messages between the MG1 and the MG2 can directly reach each other. If one of the MG1 and the MG2 is located in the public network and another of them is located in the private network, or if the two gateways are located in two different private networks through which an IP message cannot directly reach each other, unidirectional connectivity or non-connectivity of a media stream may arise. The same problem may also arise in a situation where only one of two ends of a media stream is a media gateway and another end is a Session Initiation Protocol (SIP) terminal or an H.323 terminal, is in a Circuit Switched (CS) domain or in a packet network and the like.

Typically, the Network Address (Port) Translation (NA(P)T) technology is adopted for transmitting an IP message between a public network and a private network. For the sake of convenience, both the Network Address Translation (NAT) and the Network Address Port Translation (NAPT) will be referred to as the NAT hereinafter.

There are four types of NAT, i.e., Full Cone, Restricted Cone, Port Restricted Cone and Symmetric. Differences between the four types will be described below by way of an example.

It is assumed that a local media address of a machine A in the private network is 192.168.0.1, an address of an NAT server is 210.21.12.140, a local media address of a machine B in the public network is 210.15.27.166, and a local media address of a machine C in the public network is 210.15.27.140.

Now, the machine A is connected to the machine B through an NAT device, and it is assumed that A (192.168.0.4:5000)-> NAT (translated to 210.21.12.140:8000)->B (210.15.27.166:2000). Meanwhile, A has never communicated with C.

For the type of Full Cone NAT, if C transmits data to 210.21.12.140:8000, the NAT transmits the data packet to A (192.168.0.4:5000), because the mapping from 192.168.0.4:5000 to 210.21.12.140:8000 already exists in the NAT.

For the type of Restricted Cone NAT, C cannot communicate with A because A has never communicated with C, and the NAT rejects any action of C of attempting to connect to A. However, B can communicate with 192.168.0.4:5000 of A via 210.21.12.140:8000, and here B can communicate with A via any port. For example, 210.15.27.166:2001->210.21.12.140:8000, and the NAT will transmit it to the port 5000 of A.

For the type of Port Restricted Cone NAT, C cannot communicate with A because A has never communicated with C. Moreover, B can only communicate with 192.168.0.4:5000 of A via its 210.15.27.166:2000 because A has never communicated with other ports of B. This type of NAT is port-restricted.

The above three types can all be referred to as Cone NAT, and they have a common property in that: the NAT translates all packets coming from the same internal address and port to the same external address and port. However, Symmetric is slightly different. Specifically, the NAT translates packets coming from the same internal address and port and going to the same external destination address and port to the same external address and port. By using a different mapping, the NAT translates packets coming from the same address and port and going to a different external destination address and port to a different address and port. As in Port Restricted Cone, a packet can be transmitted only from an external address which has received a packet transmitted by an internal address to the internal address via an NAT mapped address.

Now, Symmetric NAT will be described by way of another example. It is assumed that the machine A has connected to the machine B, and it is assumed that the connection is represented by A (192.168.0.4:5000)->NAT (translated to 210.21.12.140:8000)->B (210.15.27.166:2000). At this time, if the machine A (192.168.0.4:5000) also wants to connect to the machine C (210.15.27.140:2000), a new mapping is generated in the NAT with a corresponding translation possibly of A (192.168.0.4:5000)->NAT (translated to 210.21.12.140:8001)->C (210.15.27.140:2000). At this time, B can communicate with 192.168.0.4:5000 of A only via 210.15.27.166:2000 of B through 210.21.12.140:8000 of the NAT, C can communicate with 192.168.0.4:5000 of A only via 210.15.27.140:2000 of C through 210.21.12.140:8001 of the NAT, and other ports of B or C cannot communication with 192.168.0.4:5000 of A.

The NAT traversal technology refers to that a terminal with a private IP address in the private network accesses to the public network through a Network Address (Port) Translation/Fire Wall (NA(P)T/FW) at an exit. Audio and video applications based on the protocols such as H.323, SIP, Media Gateway Control Protocol (MGCP) and the like need to implement destination addressing by using IP address and port parameters in a signaling message. Therefore, an NAT traversal not only requires translation of port information of the Transmission Control Protocol/User Datagram Protocol (TCP/UDP) layer as well as a source address and a destination address of the IP layer, but also requires translation related address information in an IP packet payload (i.e., signaling).

STUN and TURN are two kinds of NAT traversal approaches commonly used.

The STUN stands for Simple Traversal of UDP Through Network Address Translators, i.e., a simple UDP traversal approach for NAT. An application, i.e., an STUN client, transmits an STUN request message to an STUN server outside an NAT, and upon reception of the request message, the STUN server generates a response message carrying a source port of the request message, i.e., an external port corresponding to the STUN client in the NAT. Then, the response message is transmitted to the STUN client through the NAT, and the STUN client knows its external address in the NAT from contents in the message body of the response message, and puts the external address into a UDP load of a subsequent call protocol to notify the peer end that the local RTP receiving address and port number are the external address and port number in the NAT. A media stream can successfully traverse the NAT because an NAT mapping table entry of the media stream has been created in advance in the NAT through the STUN protocol.

A major advantage of the STUN protocol lies in that no modification needs to be made to the existing NAT/FW device and the STUN approach can be used in a network environment with a plurality of NATs being connected in series. The limitation of the STUN lies in that: the terminal in the private network has to support functions of an STUN client, traversal of the Symmetric NAT type is not supported but an exit NAT of the Symmetric NAT type is typically adopted in an intranet with a relatively high security requirement.

The TURN stands for Traversal Using Relay NAT, i.e., a traversal for NAT by a relay approach. A TURN application model allocates an address and port of a TURN server as an external receiving address and port of a Voice Over IP (VOIP) terminal in the private network, i.e., messages transmitted from the terminal in the private network are all relayed by the TURN server. In addition to the advantage of the STUN approach, this approach also overcomes the drawback of an STUN application being unable to traverse a Symmetric NAT or a similar firewall device, and the TURN also supports a TCP based application. Furthermore, the TURN server controls address and port allocation, and can allocate a pair of RTP/RTCP addresses (an RTP port number plus 1 is an RTCP port number) as a receiving address of an end user in the private network, thereby avoiding arbitrary allocation of RTP/RTCP addresses and port numbers by the exit NAT as in the STUN approach, which leads to the client being unable to receive an RTCP message transmitted from the peer end (the RTCP message is transmitted from the peer end with a default destination port number being an RTP port number plus 1). Unlike the STUN approach that results in an external address in the exit NAT, the TURN approach results in a public network address in the TURN server.

The limitation of the TURN lies in that: the VOIP terminal has to support a TURN client as in the STUN requiring a network terminal. Furthermore, the relay of a media stream via the TURN server may cause an increased delay of a packet and an increased possibility of losing packets. The TURN approach is also referred to as a forward approach of the STUN approach.

An existing H.248 protocol based method for a traversal through an NAT is described below.

In an H.248 message to be transmitted to the gateway 2 in the public network, the media gateway controller specifies that a CPE2 carried in a far end Session Description Protocol (SDP) packet of a RTP endpoint RTP/2 is a private network address of the peer end of a media stream in the private network behind the NAT device.

When a media stream transmitted from the peer end in the private network, i.e., the endpoint with the private network address of the CPE2, passes the NAT, the NAT translates its address into a CPE1, but in the H.248 protocol, the endpoint RTP/2 will transmit the media stream to the private network address CPE2, and this is actually unreachable for the endpoint RTP/2. Consequently, an H.248 signal is added in the H.248.37, and the H.248 signal is issued to the endpoint RTP/2 as an instruction for an NAT traversal. At this time, the endpoint RTP/2 replaces the private network address CPE2 in the far end SDP with the public network address CPE1 of the actually received media stream. The media stream transmitted from the endpoint RTP/2 is transmitted to the CPE1, and according to an address mapping relationship created in advance, the NAT transmits the media stream received by the CPE1 to the address CPE2 in the private network. As can be seen from the above implementation processes, to connect a media stream, it is required that the endpoint in the private network transmits a media stream to the endpoint in the public network first, so that the NAT device is activated to generate address mapping, and according to the source address of the received media stream, the endpoint in the public network determines the destination address to which it transmits media stream.

However, a demand for unidirectional media may arise in a lot of situations. For example, a demand for a ring back tone, a color ring and the like to be played by the peer end, and at this time, for the reason that the called party is not off-hook, the calling party in the private network does not transmit any media stream, so that the calling party in the private network cannot receive a media stream. Furthermore, when a silence detection is activated, there is no media stream transmitted from the private network to the public network if the user in the private network is silent, and the public network cannot transmit a media stream to the private network. In other words, in the specification defined in the H.248.37, the endpoint in the private network has to transmit a media stream to the endpoint in the media gateway of the public network first, otherwise the endpoint in the public network intended to transmit a media stream cannot transmit the media stream to the peer end due to the absence of a public network address to which the NA(P)T maps the private network address of the peer end.

Furthermore, although the STUN server or the TURN server can be used to enable an NAT traversal, a media stream may likely fail to be connected for the types of Restricted Cone, Port Restricted Cone and Symmetric even if the endpoint in the private network has obtained, through the STUN or the TURN, a public network address to which the private network address is mapped. FIG. 2 illustrates a schematic diagram of networking based on the NAT type of Restricted Cone in the prior art, where it is assumed that a local media address of a media gateway 1 is an address B which is mapped to an address A by an NAT, and a local media address of a media gateway 2 is an address X. At this time, even if a media stream transmitted from the media gateway 2 arrives at the address A, it cannot be ensured that the NAT can forward the media stream to the local media address B of the media gateway 1. This is because a preceding STUN message was transmitted from the media gateway 1 to an address Y of the STUN server, and there is no media stream transmitted to the media gateway 2, but for the above three NAT types, a media stream transmitted from the address X can be returned the address B through the NAT only if a message is transmitted from the address B to the address X first.

Furthermore, the NA(P)T has a lifecycle restriction for an address mapping, and the existing address mapping is deleted if it has never been used during the lifecycle. Thus, a media stream cannot be transmitted from the outside of the NA(P)T to the inside of the NA(P)T, and even if a new media stream is transmitted out of the NA(P)T, the NA(P)T may likely map a new public network address for the media stream. A problem may also arise if the peer end uses a previously stored old mapped public network address.

Forwarding a media stream through the TURN server may also encounter similar problems as through the STUN server.

As can be seen in the systems described above, a media device in the private network, such as an MG and various types of terminals and the like, has to transmit a media stream to the peer end first even if the media device has been mapped to a public network address, otherwise a media stream transmitted from the peer end of the media device in the private network first cannot be ensured to arrive at the media device. Furthermore, in these system, an address mapping in the NA(P)T may fail to remain alive in the event that no media stream has passed for a period of time.

SUMMARY OF THE INVENTION

The invention provides a method and system for connecting a media stream to solve the problem in the conventional systems where there is no path for a media stream transmitted from the peer end of a media device in a private network to arrive the media device in the private network due to the absence of an address mapping in an NA(P)T because the media device in the private network does not transmit any media stream to the peer end first, and the problem that an address mapping in the NA(P)T cannot be kept alive.

The invention provides a method for connecting a media stream, including (1) transmitting, by a media gateway in a private network, a connecting message to an external network device through a network address translation device; and (2) receiving, by the network address translation device, the connecting message, wherein the connecting message is used for generating a new address mapping, which is used for a subsequent media stream to pass through the network address translation device, in the network address translation device when there is no address mapping available in the network address translation device, and is used for keeping alive an address mapping when the address mapping is already available in the network address translation device.

The invention provides a method for detecting connectivity, including (1) transmitting, by a media device in a bearer network, a connecting message to another media device; (2) determining whether a response message for the connecting message is received within a predetermined period of time; and (3) determining bidirectional connectivity of a network path in the bearer network, where the two media devices are located, when the response message for the connecting message is received within the predetermined period of time.

The invention provides another method for detecting connectivity, namely detecting whether a media device in a bearer network has received a media stream and/or a connecting message transmitted from the peer end within a predetermined period of time, and if so, determining connectivity in a direction from the peer end to the media device, otherwise determining non-connectivity in the direction from the peer end to the media device.

The invention provides a system for connecting a media stream, including a device in a private network, a network address translation device and a peer end network device of the device in the private network, wherein the device in the private network includes (1) a message generating unit, adapted to generate a connecting message; and (2) a connecting unit, adapted to transmit the connecting message to the peer end network device through the network address translation device; and the network address translation device comprises (a) an address mapping unit, adapted to generate, according to the connecting message, a new address mapping, wherein: according to the connecting message, the new address mapping, which is used for a subsequent media stream to pass through the network address translation device, is generated in the network address translation device when there is no address mapping available in the network address translation device; and (b) a keeping-alive unit, adapted to keep alive, according to the transmitted connecting message, an address mapping, wherein: the address mapping is kept alive according to the connecting message when the address mapping is already available in the network address translation device.

The invention provides a system for detecting connectivity, including (1) a connectivity detecting unit, adapted to detect whether a bearer network where media devices are located has connectivity, wherein whether a first media device in the bearer network has received a media stream and/or a connecting message transmitted from a second peer end media device within a predetermined period of time is determined, and if so, connectivity in a direction from the peer end to the media device is determined, otherwise non-connectivity in the direction from the peer end to the media device is determined.

The invention further provides a media device, including (1) a message generating unit, adapted to generate a connecting message, wherein a type of the connecting message comprises a media message, a silence information description message, an RTP No-Op message, an RTP packet with an unknown payload type, a UDP packet of 0 byte, a message in a self-defined format, or an STUN binding request; and (2) a transmitting unit, adapted to transmit the connecting message to a peer end device through a network address translation device.

The invention further provides a network address translation device, including (1) a receiving unit, adapted to receive a connecting message; (2) an address mapping unit, adapted to generate, according to the connecting message, a new address mapping, wherein: according to the connecting message, the new address mapping, which is used for a subsequent media stream to pass through the network address translation device, is generated in the network address translation device when there is no address mapping available in the network address translation device; and (3) a keeping-alive unit, adapted to keep alive, according to the transmitted connecting message, an address mapping, wherein: the address mapping is kept alive according to the connecting message when the address mapping is already available in the network address translation device.

The method for connecting a media stream according to the embodiments of the invention can be applied in a way that the device in the private network and the peer end device can unidirectionally or bidirectionally transmit a connecting message through the network address translation device, and the connecting message can generate an address mapping in the network address translation device, so that a media stream transmitted from the peer end of the device in the private network can be transmitted to the media device in the private network by using the address mapping as a transmitting path, thereby avoiding the limitation that the media device in the private network has to transmit a media stream to the peer end first, and address mappings in the NA(P)T and in the TURN server can be kept alive. The method for detecting connectivity according to the embodiments of the invention can be applied to detect bidirectional connectivity of a bearer network in a way of determining whether a media device in the bearer network has received a response message for a connecting message transmitted from another media device within a predetermined period of time, and if so, it indicates bidirectional connectivity between the two media devices in the bearer network. The method for detecting connectivity according to the embodiment of the invention can be applied to detect unidirectional connectivity of a bearer network in a way of determining whether a media device in the bearer network has received a media stream and/or a connecting message transmitted from the peer end within a predetermined period of time, and if so, it indicates connectivity in the direction from the peer end to the media device.

DETAILED DESCRIPTION OF THE EMBODIMENTS

Figure 3:
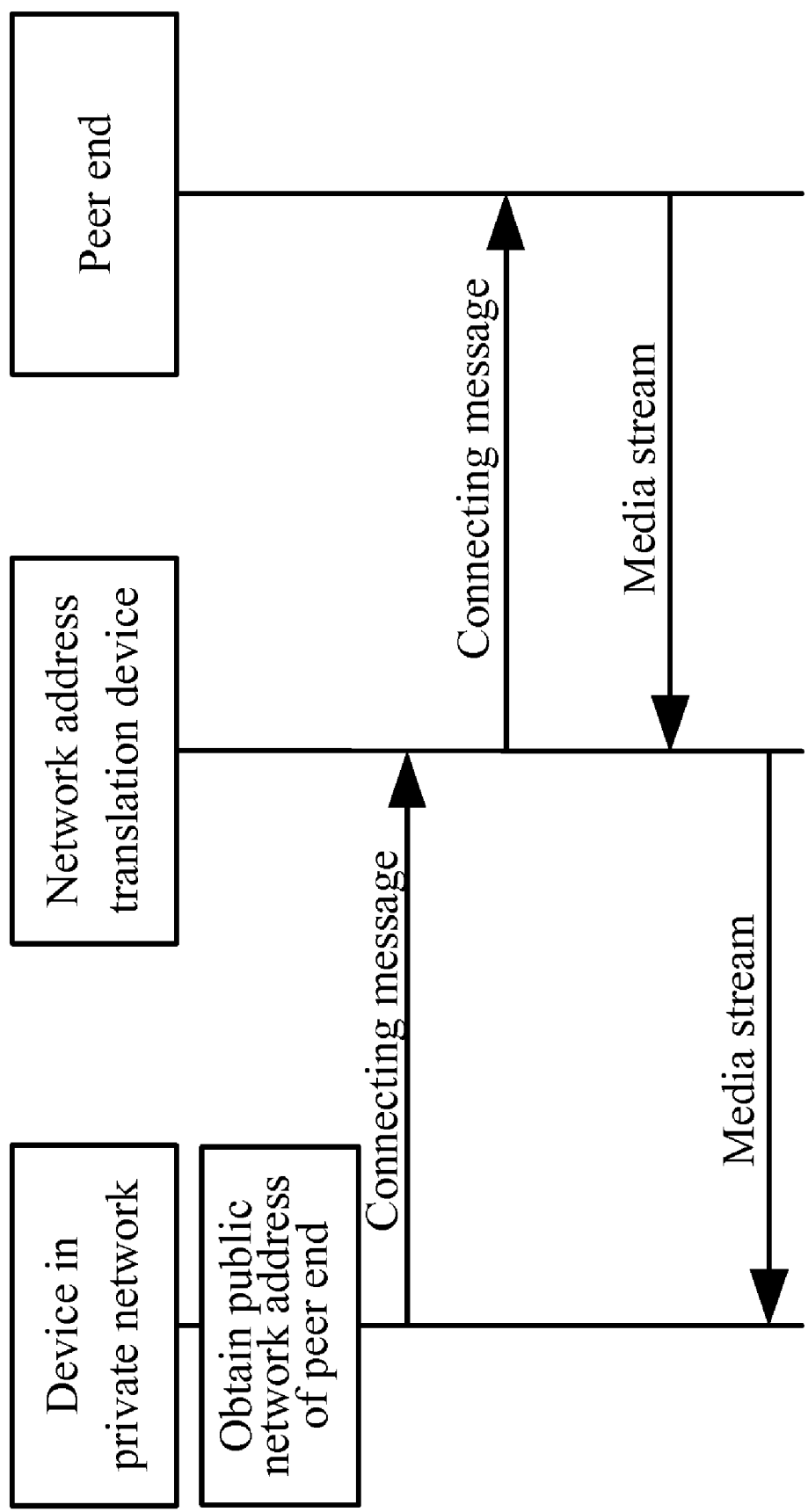
FIG. 3 illustrates a schematic diagram of a flow of the method for connecting a media stream according to an embodiment of the present invention.

In the flow of the method for connecting a media stream according to an embodiment of the invention as illustrated in FIG. 3, a device in a private network transmits a connecting message to its peer end through a network address translation device, and a destination address of the connecting message may be a public network address of the peer end, or a public network address of the peer end mapped by the network address translation device. When the connecting message passes through the network address translation device, an address mapping is generated in the network address translation device, and the address mapping is the public network address of the private network device for connecting a media stream. Upon reception of the connecting message, the peer end can obtain from the connecting message the public network address of the private network device for connecting a media stream. Therefore, in other words, the connecting message establishes a media stream channel, and through the media stream channel established by the address mapping for the device in the private network and resulted from the connecting message, the network address translation device receives a media stream transmitted from the peer end and transmits it to the device in the private network to realize connecting the media stream.

The public network address, which is required for the peer end, mapped for the device in the local end private network can be obtained from the connecting message or in other approaches, for example, in the STUN/ICE approach (RFC 3489 and draft-ietf-mmusic-ice-09.txt). After the peer end can obtain the public network address in other approaches, for the NAT of a type other than Full Cone, the primary function of the connecting message is to provide a media path, thus the peer end can transmit a media stream to the device in the private network along a path reverse to the connecting message. In the case that no such connecting message or any other message is transmitted from the device in the private network to the peer end, even if the peer end obtain the public network address mapped for the device in the private network in other approaches, a message transmitted from the peer end to the public network address is rejected by the NAT. Of course, if the peer end has not previously obtained the public network address mapped for the device in the private network, the primary function of the connecting message may also be to obtain the public network address, for the reason that: the media stream can be connected as long as the public network address has been obtained, because the connecting message for enabling connectivity has the same path as that of the media stream. Consequently, it is definitely possible for the connecting message to be used for both of the above functions.

Thus, after establishing a call, the peer end of the device in the private network can duly obtain a public network address in an NA(P)T mapped for a far end private network address, and takes it as a far end address, so that a media stream can be initiated from the peer end of the device in the private network and forwarded through the NA(P)T to the device in the private network, thereby obviating the limitation that the media stream has to be initiated from the device in the private network. As can be seen, the embodiments of the invention can be applied to solve not only the problem in the H.248.37 scenario but also the problem in the situation that the device in the private network has obtained the public network address in the NA(P)T mapped for the local media address by some approaches, and the type of the NA(P)T is Restricted Cone, Port Restricted Cone or Symmetric. Of course, if the two ends of the media stream are located in different private networks, all the ends shall transmit a connecting message to the peer end from the NA(P)T. Connectivity in this application refers to that due to an address mapping being exist in the NA(P)T or TURN, a connecting message shall be used to generate and keep the address mapping, or the peer end shall be enabled to transmit a media stream in a direction reverse to the direction of the connecting message, thereby connecting the media stream.

Furthermore, once the address mapping in the NA(P)T or the TURN server has been activated, a connecting message in either direction can be used to keep the mapping, thereby keeping alive the NA(P)T address mapping.

Figure 1:
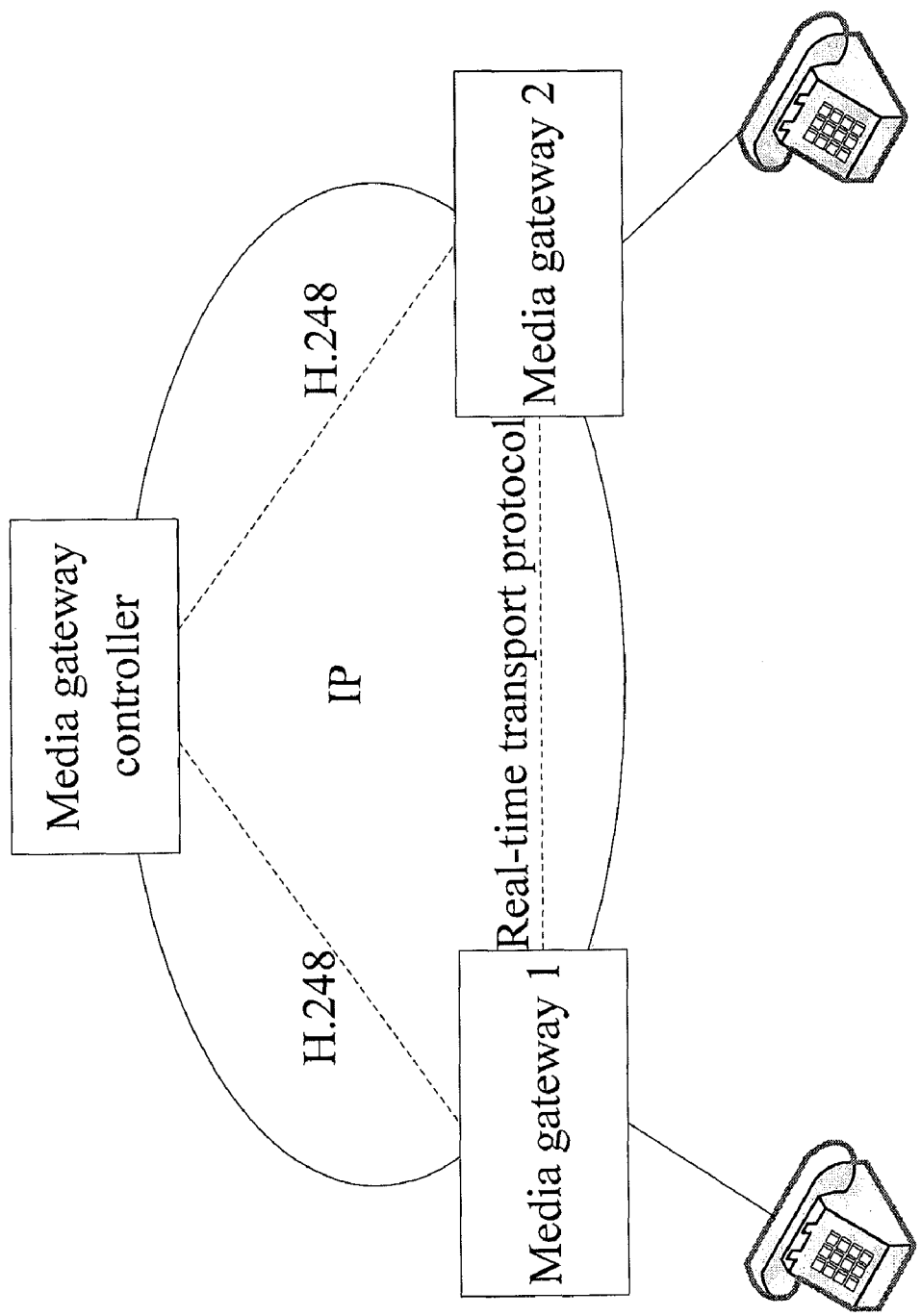
FIG. 1 illustrates a schematic structural diagram of an existing NGN network.
Figure 2:
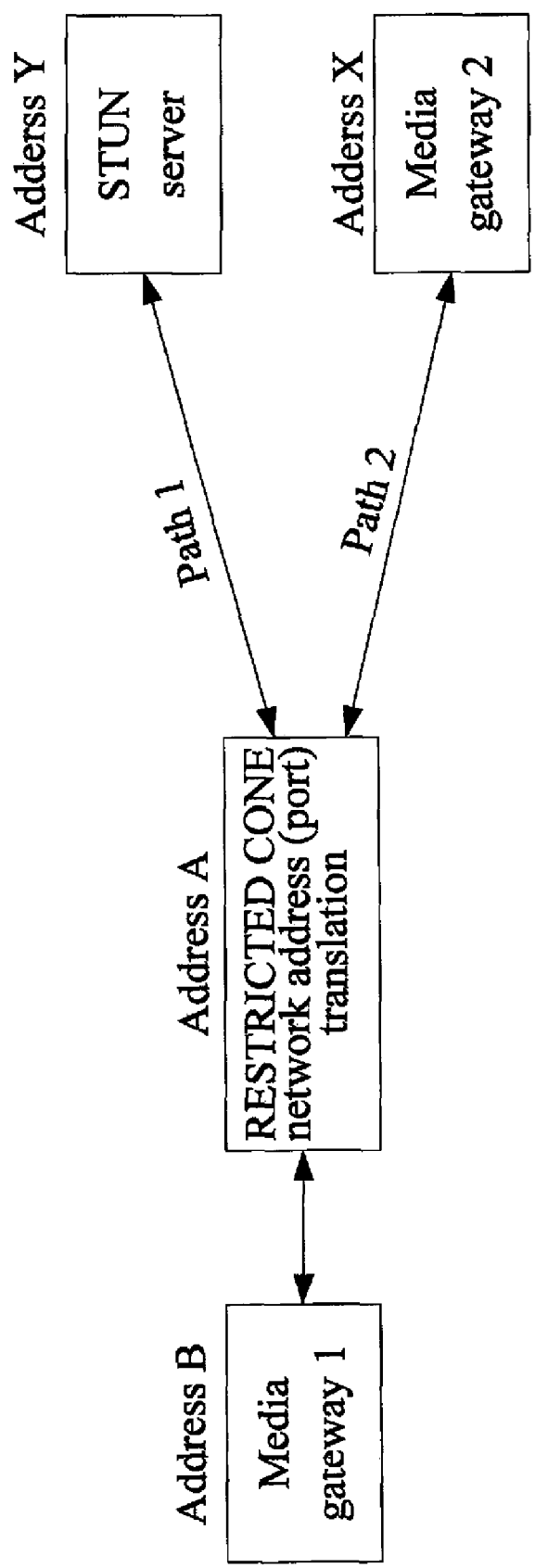
FIG. 2 illustrates a schematic diagram of networking based on the NAT type of Restricted Cone.

The idea of the invention will be further explained below with reference to FIG. 2. After obtaining, through the STUN server, the public network address A mapped by the NA(P)T for the local address B, the MG1 transmits a connecting message to the address X of the MG2, thus a media stream initially transmitted from the address X to arrive at the address A can be forwarded to the address B by the NA(P)T. Of course, the address B can also initially transmit a media stream to the address X. For the reason that in some cases, there is no media stream transmitted from the address B to the address X but it is needed to transmit a media stream from the address X to the address B, thus by implementing the connecting message, the limitation that the media stream has to be initiated from the device in the private network can be avoided.

It shall be noted that a public network address and a private network address described herein are both referred to with respect to an NA(P)T. A network address internal to the NA(P)T is referred to as the private network address, and an address mapped by the NA(P)T for the private network address is referred to as the public network address.

If devices at two ends are located in different private networks, each device transmits a connecting message to the peer end through a public network address mapped by an NAT, and if the type of the NAT is Restricted Cone, each device activates an address mapping in the NAT used by the local end, then each end can transmit a media stream to the peer end along the same path.

The above device in the private network may be an MG in the private network, or other media processing devices of various types in the private network, such as an H.323 terminal, an SIP terminal (including an SIP IAD, a user equipment supporting the SIP) and the like. The above peer end of the device in the private network may be an MG or other media processing devices, such as an H.323 terminal, an SIP terminal (including an SIP IAD, a user equipment supporting the SIP) and the like. The above peer end of the device in the private network may be located in the public network or in another private network, and the two private networks can be connected through an NA(P)T or NA(P)T connecting to a packet network.

If the device in the private network is an MG, the MG can initiate a connecting message on its own initiative or under the control of an MGC. The type of the connecting message can be decided by an MG itself or can be specified by the MGC. The MGC can audit the MG to obtain the types of a connecting message that the MG can support, and the support can be subdivided into a support for transmitting and a support for receiving and processing.

If the MG is a gateway not supporting the STUN, after the MG has established a call, the types of a connecting message transmitted from the MG includes a media message, a Silence Information Description (SID) message, an RTP No-Op message and a message in another format as defined in the IETF draft-marjou-behave-app-rtp-keepalive-00.txt and subsequent revisions of this draft, or other connecting messages in a self-defined format. Particularly, the RTP message may be an RTP message with media being packaged and transmitted normally as if no VAD function is activated. For example, audio data are packaged according to a 20-millisecond time length into an RTP message with a coding method of G.729 and a packaging time length of 20 milliseconds. A media stream in a format other than the RTP format can also use a "harmless" message, in the same format as that of the media stream but with null contents, as its connecting message, and it should be the precondition that normal service data processing is not influenced.

If the MG is a gateway supporting the STUN, after the MG has established a call, the MG can transmit an STUN binding request message as a connecting message in addition to the above types of connecting message. Here the connecting message is used to generate an IP message from the inside of the NAT to the outside of the NAT, so that a real media stream from the outside of the NAT can be transmitted back along the original path. The use of the STUN binding request as a connecting message has an advantage that a mapped address can be returned by the STUN binding request, and if an address mapping in the NAT is lost due to resetting of the NAT or other failure of the bearer channel, the mapped address carried in a response message for the connecting message may be changed, thus even if there is a response to the connecting message, it can be determined that the media stream cannot come back in a reverse direction due to the change of the address, thereby avoiding such a situation that a new public network address is re-mapped by the NA(P)T but the peer end still transmits a media message to a previously stored old mapped address, which leads to a media stream fails to be connected. If a mapped address mapped by the NAT is changed, a source address of a connecting message or a media stream received at the public network side is also changed, the MG can notify the change to the MGC, and the MGC can further instruct the public network side to modify a far end address so that a media stream can be bidirectionally connected.

A specific format of the connecting message mentioned above can be self-defined, or can be an existing format having not been listed here. In a practical application, the format is not limited to those having been listed.

When a connecting message is initiated under the control of the MGC, the H.248 protocol and/or the MGCP protocol shall be extended. The extending approaches of the two protocols are similar to each other in that a signal is issued to instruct the MG to transmit a connecting message. The signal can specify those local media address being required to transmit a connecting message.

An embodiment of the H.248 will be described below, and an embodiment of the MGCP is similar to that of the H.248 and repeated descriptions are omitted here.

The H.248 is extended with an H.248 based media bearer connecting packet "traffct".

A signal "scp" is defined for the MGC to instruct the MG to transmit a connecting message. This signal can generally ask the MG to transmit a connecting message in all media channels, or particularly specify some parameters of a connecting message.

Addresses in the local SDP are numbered, for example, with a format of <N, X, Y>, where N refers to a serial number and is arranged in sequence starting from 1, X refers to a group number, and Y refers to an address serial number in the group. For example, "<2, 2, 1>" represents that an address with the serial number of 2 is the first address in the second group of the local SDP. Thus, each of the addresses in the local SDP can be provided with a unique serial number.

For the above signal "scp", the type of its parameter "fa" (From Address) is defined as a list of character strings. In a request message transmitted from the MGC to the MG to instruct the MG to transmit a connecting message, each item in the list can take the following values:

L: "Local Address", which indicates transmission from a local address.

N: "No Request", which indicates that a local address with the serial number is not required to transmit a connecting message.

A serial number of a character string in the list corresponds to the serial number of the numbered address in the above SDP.

For example, if the list of character strings is "L, N, N, L", it indicates that local addresses with serial numbers of 1 and 4 transmit a connecting message to the peer end and local addresses with serial numbers of 2 and 3 is not required to transmit a connecting message.

If a receiving address only corresponds to one source address, there is no need to distinguish different media streams and hence there is no need to carry media type information in a connecting message.

If a receiving address needs to receive different media flows from several source addresses, there may be a need to distinguish the different media streams, otherwise the peer end having received a connecting message at the receiving address cannot determine a connected address mapping is in which NA(P)T, hence cannot determine which media stream a path established through the address mapping is used for. Therefore, there is a need to carry information, which can distinguish different media streams, in the connecting message. At this time, the following several cases may exist:

If a media message is used as the connecting message, the message already carries media stream information. For example, if a media stream is of the G.711, the connecting message is also of the G.711.

If the connecting message is in a self-defined format, there is also a need to carry information for distinguishing different media streams in the connecting message, for example, to carry a media attribute such as a payload type and the like.

If an STUN binding request is used as the connecting message, there is also no need to carry information for distinguishing different media streams in the connecting message, because in the case of using the STUN protocol, the peer end of the device in the private network has already obtained a public network address mapped for a private network address, therefore the peer end represents which media stream in the SDP can be determined by analyzing a source address in the STUN request, so that there is no need to distinguish.

Furthermore, while designing the connecting message, it shall be considered that the message is simply discarded if it cannot be parsed by the peer end, without incurring any adverse influence.

Because a connecting message may be lost during transmission, the connecting message without a response mechanism may be transmitted repeatedly so as to avoid a false determination resulting from the connecting message being lost on its way.

Furthermore, upon reception of a connecting message, the peer end of the device in the private network can further make a response to the connecting message so as to not only avoid repeated transmission of the connecting message but also enable the sender to confirm that the path is connected. This response can be made by the peer end device automatically or under control. In other words, the peer end of the device in the private network may make a response directly, i.e., a default response, or may be instructed to support a response. A specific responding approach can just be a simple response message. After successful mapping in the NAT and a media stream having been connected, either of interacting parties can initiate a connecting message on its own initiative.

Furthermore, the device in the private network can further make a response to the received response so as to implement a three hand-shaking mechanism.

If the peer end of the device in the private network is an MG, whether to make a response automatically can be configured, or the protocol can be extended with a packet having a defined attribute "scprep". If the value of the attribute is TRUE, it indicates that a local media address can make a response to a connecting message so as to avoid repeated retransmission of the connecting message. If the value of the attribute is FALSE, no response is made.

The above response may be a loop made by the receiving end which return the received connecting message, or may be a different message generated by the receiving end itself and used as a response message.

In a case with no response mechanism, a connecting message can be transmitted from one end to another end, and the another end detects the connecting message and a media stream message. If the peer end can receive the messages, it indicates connectivity from the local end to the peer end. As can be defined flexibly for a practical application, the detector can detect either or both of the connecting message and the media stream message. On the contrary, a connecting message or a media stream message can be transmitted from the peer end and detected at the local end, so that connectivity from the peer end to the local end can be detected. Bidirectional connectivity can be obtained by combining the detection results in the two directions.

Furthermore, transmission of a connecting message can be stopped after confirming connectivity of a media stream. There are a plurality of confirming approaches, for example, transmission of a connecting message can be stopped upon reception of a response, or transmission of a connecting message can be stopped upon reception of a media stream or a connecting message transmitted from the peer end. For example, it is assumed that a device behind an NA(P)T transmitting a connecting message is a device A, the peer end is a device B which may be located in the public network or in the private network and the private address of the device B is mapped to a public network address by an NA(P)T. At this time, if the device A transmits a connecting message to the device B and receives a service data stream in the reverse direction, i.e., a media stream from the device B, it indicates that the purpose of transmitting the connecting message has been achieved and connectivity from the device B to the device A is accomplished, so that the device A can stop transmission of a connecting message. In this scenario, it is mainly focused on connectivity from the outside of the private network to the inside of the private network.

Because an address mapping in an NA(P)T has a lifecycle, i.e., a certain address mapping is deleted if the mapping has not been used for a long period of time. Transmission of a connecting message in either of the two directions can achieve the purpose of keeping alive the address mapping in the NA(P)T. Furthermore, a connecting message as described in the invention can also be used as a heartbeat mechanism. The device behind the NA(P)T detects a transmitted or received media stream, if no transmission or reception of any media stream is performed for an address mapping during a predetermined period of time, the device transmit a connecting message in order to prevent the address mapping from being deleted due to time-out, thereby ensuring the existence of the address mapping. When a connecting message is used as a heartbeat mechanism, transmission of the connecting message can be stopped temporarily in the case that there is a media stream, or the connecting message can be transmitted periodically without considering the status of a media stream so as to simplify the processing logic.

If the device behind the NA(P)T is a media gateway, the H.248/MGCP protocol can be extended in a way that the MGC issues an attribute or a signal to instruct the media gateway to periodically transmit a connecting message traversing through the NA(P)T device to the peer end of a media stream, and the transmission period can be specified by the MGC.

A connecting message can be transmitted separately for each media stream path to ensure connectivity of each media stream. If the peer end has the function of making a response to a connecting message, this function can be further extended in a way that the end having not received a response reports abnormality. The response mechanism is not compulsory in some case, for example, each of the two ends can periodically transmit a connecting message to the peer end and can detect a received connecting message and media stream message, and if the connecting message or the media stream message can be received, it indicates connectivity of a receiving path. Bidirectional connectivity detection can be accomplished by both ends detecting connectivity of the receiving path. For a media gateway, the operation of reporting abnormality can be accomplished by adding an H.248/MGCP event "patherr" to report non-connectivity of a media stream path. For an SIP device, the operation of reporting abnormality can be accomplished by an approach of defining an event report. Similar to the H.248/MGCP, the SIP device can report the event by subscription or predetermination.

There is another case that a local end address corresponds to a plurality of peer end address for transmission and reception of a media stream during media negotiation, and there may be one or more NA(P)Ts between the two ends, so that the same local address may correspond to a plurality of media streams. Although this case is rare, the MGC shall specify a single media stream while issuing a signal to instruct transmitting a connecting message or reporting non-connectivity of a connecting message, therefore there is a need to add and modify description approaches. An example of the SDP is as follows.

"v=0
c=IN IP4 10.1.1.1
m=audio 1000 RTP/AVP 0 18"

The above three lines mean that the media uses the type of audio, uses the IPV4, and a bearer of the media uses the RTP protocol (defined in the RFC3551). A Codec uses the PCMU and the G.729 for coding and decoding.

As know in the prior art, if two media streams have different addresses at the peer end and the NAT type is Symmetric, the local media address in the private network "10.1.1.1:1000" is mapped to two public network addresses in the NAT. It is assumed that the addresses of the two media streams at the peer end are an address A and an address B respectively, and the address A and the address B are different (including different IP addresses or different ports). If the NAT type is Restricted Cone, although the local private network media address "10.1.1.1:1000" is only mapped to one public network address in the NAT, a media stream from the address B cannot be returned through the NAT to the private network address "10.1.1.1:1000" if there is no media message transmitted from "10.1.1.1:1000" to the address B even if there is a media stream interacting between the private network address "10.1.1.1:1000" and the address A. It is assumed that the addresses of the two media streams at the peer end are an address A and an address B respectively, and the address A and the address B are different IP addresses. If the NAT type is Port Restricted Cone, although the local private network media address "10.1.1.1:1000" is only mapped to one public network address in the NAT, a media stream from the address B cannot be returned through the NAT to the private network address "10.1.1.1:1000" if there is no media message transmitted from "10.1.1.1:1000" to the address B even if there is a media stream interacting between the private network address "10.1.1.1:1000" and the address A.

Consequently, in the above case, it is insufficient to transmit a connecting message for each local media address, and it is necessary to transmit a connecting message for each single media stream. Therefore, a parameter "faext" is defined for the signal "scp", the type of the parameter "faext" is a list of character strings, and each line of the list is in the following format:

<address serial number>, <media stream number>

This lists media stream paths being required to transmit connecting messages.

The media stream number is a media stream number under the same address serial number, for example, the last item in "m=" mentioned above is the format list <fmt list>, i.e., a format list of media formats. In this example, the payload type of RTP packet is listed, here i.e., two payload types 0 and 18 representing the G.711 (i.e., the PCMU) and the G.729. Serial numbers of the media stream number are arranged in sequence starting from 1. The media stream number is an optional item. If the media stream number is not contained, it is indicated that all media streams of the address serial number are enabled.

For example, "1" indicates an address with the serial number of 1, i.e., a connecting message is transmitted from the address "10.1.1.1:1000". If far end addresses of the PCMU and the G.729 are different and the NAT type is not Full Cone, it is required to transmit connecting messages for both different destination addresses. There is an exceptional case, for the NAT type of Port Restricted Cone, if two destination addresses have identical IP addresses and different ports, it is only required to transmit a connecting message to one of the addresses, and this is resulted from the characteristics of the Port Restricted type. If a connecting message is only transmitted for one of the media streams, "1, 2" can be used to indicate that a connecting message is transmitted from the private network address "10.1.1.1:1000" to the G.729 peer end address with the media stream number of 2.

Typically, the peer end corresponding to all media described in the same "m=" line is also a unique address (for example, the SDP at the peer end also puts these media in the same "m=" line), all the media described in the line only correspond to the same media path, i.e., a path with the same source address and the same destination address. At this time, there is no need to distinguish media stream numbers.

Of course, the NAT type may not be considered, and it is specified to transmit connecting messages in part of or all of media stream paths. Thus, a complex logic resulting from determining the NAT type can be avoided. For example, in the above description, if the NAT type is Full Cone, it is only required to transmit a connecting message in one media stream path (e.g., only in the G.711 media path but not in the G.729 media path) to ensure proper generation or keeping of an NAT mapping. However, such a complex consideration may be unnecessary in a practical application, and the MGC can ask connecting messages to be transmitted in both paths. Furthermore, in the case of further use for detecting connectivity, the NAT is only a part of the entire media channel, therefore it may be required to implement whole path detection for each media stream path.

In the case of transmitting a connecting message for a single media stream, it can be further extended with a function of reporting connectivity failure, and at this time it is required to particularly specify which media stream is in connectivity failure. An example of the H.248 will be described below, and an example of the MGCP is similar to that of the H.248.

For the H.248, an event "patherr" can be defined to report a parameter "ep" (error path) of the event, and the type of the parameter is a list of character strings. Each character string in the list is in the following format:

<address serial number>, <media stream number>

As in the above example of the SDP, "1, 2" indicates that no response can be obtained for a connecting message in a path through which a media stream with the address serial number of 1 and the media stream number of 2 passes. In some cases, there is no need to specify different items in the format list in the "m=" line, and it is sufficient to report the address serial number. Therefore, the media stream number is still an optional item.

Attributes of an IP media stream typically include a 5-Tuples of a source IP address and a source port, a destination IP address and a destination port, and the type of a media transmission protocol of the path. Therefore, different media streams with the same source address and the same destination address can share the same connecting message and the same heartbeat detection so as to avoid repeated connectivity detection or repeated keeping of an NA(P)T address mapping for the same path.

The peer end device may be unable to make a response to a connecting message, or the format of a response message has not been defined for a connecting message itself, but the peer end device can also transmit a connecting message. In a specific implementing method, the MGC instructs two gateways at two ends of a media stream to both periodically transmit connecting messages to the peer end. The two ends both detect reception of a connecting message or a media stream message, and reports an event to the MGC if no message is received within a predetermined period of time. Alternatively, only one end makes detection, which results in unidirectional connectivity being detected.

In the case of a connecting message being an STUN binding request message, see Connectivity Checks in the IETF draft of draft-ietf-mmusic.ice-09.txt, if a mapped address carried in a response message for the STUN binding request is changed, it indicates that the NAT address may have been updated, and it is also required to report an event for notifying the MGC, so that the MGC can re-initiate an STUN process for re-exchanging media stream addresses between two ends of a call. If the reported event carries an updated mapped address, the MGC can transmit the address to the peer end to enable the peer end to update an address of the far end. Regardless of the format used by a connecting message, if the source address of the connecting message is changed, or if the source address of a response message for the connecting message is changed, the event can also be used to report.

Summarized descriptions will be given below for H.248-related extended packets defined in the invention. An implementing method of the MGCP is similar to that of the H.248, and repeated descriptions are omitted here.

For a gateway supporting the STUN protocol, an STUN connectivity packet "Stunct" is defined.

(1) A signal "stunbr" is defined for transmitting an STUN binding request as a connecting message. This is equivalent to connectivity detection between operating candidates at two ends of a media stream selected in the ICE technology. In other words, connectivity detection is made along a path of the media stream.

The signal carries a parameter "fa" with the type of a list of character strings, and each item in the list can take the following values:

L: "Local Address", which indicate transmission from a local address.

N: "No Request", which indicates that a local address with the serial number is not required to transmit a connecting message.

A serial number of a character string in the list corresponds to the serial number of the numbered address in the above SDP.

If the media stream is forwarded through the STUN, the connecting message is also forwarded from the STUN as the media stream.

(2) A signal "stunbrhb" is defined for periodically transmitting an STUN binding request as a connectivity detection heartbeat.

The signal carries a parameter "fa" with the same meaning as the definition of the parameter "fa" in the signal "stunbr".

Further, the signal carries a parameter "interval" with the type of integer, in milliseconds and indicating a heartbeat interval.

The heartbeat interval applies to all address serial numbers specified in the parameter "fa" and being required to transmit a heartbeat.

If the signal requires a gateway to transmit a plurality of connecting messages, the gateway can transmit the respective connecting messages at an appropriate interval of, for example, 50 milliseconds, so as to avoid congestion due to the plurality of messages being transmitted simultaneously.

Alternatively, the parameter "fa" can be defined in a form of a list in which a heartbeat period is set separately for each heartbeat request.

If media stream data is received in the path of the heartbeat between two heartbeat intervals, a heartbeat timer is reset, and this can reduce a system burden resulting from heartbeat messages.

In the signal "stunbr" and the signal "stunbrhb", if it is required to separately control whether to transmit a connecting message respectively for a plurality of media streams with the same local address, the parameter "fa" can be replaced by the above-defined parameter "faext".

(3) An event "patherr" is defined.

This event is used to detect whether a connecting message is successful. If a response for the connecting message fails to be received, or if a mapped address carried in the response message is changed, the event is reported.

This event carries a parameter "timeout" for setting a predetermined period of time. After the connecting message is transmitted, if no response for the connecting message is received within the period of time, the event is reported.

This event further carries a parameter "fae" for setting addresses at which an STUN response message is detected. The meaning of the parameter "fae" is the same as the definition of the parameter "fa" or "faext" of the signal "stunbr". Alternatively, by default, a response message is detected at all addresses transmitting a connecting message and an abnormality is reported. If so, the parameter "fae" is unnecessary.

While being reported, this event carries a parameter "ep" with the type of a list of character strings to report a list for a connecting message without a response message. Each character string in the list is in the following format:

<address serial number>, <media stream number>

A specific usage has been described above, and repeated descriptions are omitted here.

While being reported, this event can further carry a parameter "ca" with the type of a list of character strings to report a changed mapped address in a response message of an STUN binding request or to report a changed source address of the connecting message.

It is in the following format:

<address serial number>, <media stream number>, <mapped address>

The first two parameters have the same usage as that of the parameter "ep", and the mapped address is a mapped address carried in the response message of the STUN binding request.

For more convenient description, descriptions are not given separately for connecting a path and connectivity detection for an RTCP message. Connectivity detection in an RTCP path can be made by the MG by default and simultaneously with detection of a corresponding media stream, or related contents for connecting an RTCP path and connectivity detection can be added in the packet, based on the same principle and method as those for connecting other media streams and other connectivity detection. An RTCP stream is also a component of media streams.

For a gateway not supporting or not using the STUN protocol, another media bearer connecting packet "traffct" can be defined. Furthermore, the packet "traffct" and the packet "Stunct" can also be combined into one packet to implement functions.

(1) A signal "scp" is defined for transmitting a connecting message. A connectivity detection is made along the source address and the destination address of a media stream. A specific format of the connecting message is not defined here, and the RTP No-Op message can be used as a choice.

The signal carries a parameter "fa" with the type of a list of character strings, and each item in the list can take the following values:

L: "Local Address", which indicate transmission from a local address.

N: "No Request", which indicates that a local address with the serial number is not required to transmit a connecting message.

A serial number of a character string in the list corresponds to the serial number of the numbered address in the above SDP.

(2) A signal "scphb" is defined for periodically transmitting a connecting message.

The signal carries a parameter "fa" with the same meaning as the definition of the parameter "fa" in the signal "scp".

Further, the signal carries a parameter "interval" with the type of integer, in milliseconds and indicating a heartbeat interval.

The heartbeat interval applies to all address serial numbers specified in the parameter "fa" and being required to transmit a heartbeat.

If the signal requires a gateway to transmit a plurality of connecting messages, the gateway can transmit the respective connecting messages at an appropriate interval of, for example, 50 milliseconds, so as to avoid congestion due to the plurality of messages being transmitted simultaneously.

Alternatively, the parameter "fa" can be defined in a form of a list in which a heartbeat period is set separately for each heartbeat request.

If media stream data is received in the path of the heartbeat between two heartbeat intervals, a heartbeat timer is reset, and this can reduce a system burden resulting from heartbeat messages.

In the signal "scp" and the signal "scphb", if it is required to separately control whether to transmit a connecting message respectively for a plurality of media streams with the same local address, the parameter "fa" can be replaced by the above-defined parameter "faext". It shall be noted that whether the parameter faext can be used is dependent on a format defined for a connecting message. If the connecting message itself carries no media stream information, the receiving end cannot distinguish which media stream is represented by the connecting message transmitted to the same destination address through different paths.

(3) A signal "comht" is defined to instruct transmitting a connecting message.

For detecting whether a bearer network has connectivity, there is no need to detect connectivity for each media stream established for each call, and the detection can be made by selecting an address respectively from the two ends of the bearer network and transmitting a connecting message for the selected addresses.

Parameters can be defined for the signal to carry a source address and a source port, a destination address and a destination port, a transmission period of a connecting message, and the type of the connecting message.

(4) An event "patherr" is defined.

This event is used to detect whether a connecting message is successful. If a response for the connecting message fails to be received within a predetermined period of time, or if the connecting message or a media stream message fails to be received, the event is reported. If the source address of the connecting message or its response message is changed, abnormality can also be reported by the event.

This event can further carry a parameter "timeout" for setting a predetermined period of time.

This event further carries a parameter "fae" for setting addresses at which an incoming media message is detected. The meaning of the parameter "fae" is the same as the definition of the parameter "fa" of the signal "stunbr".

Furthermore, regarding the condition of the signal "comht", it is also required that a function for directly describing the address of a detecting message is added for the parameter "fae".

While being reported, this event carries a parameter "ep" with the type of a list of character strings to report a list for a connecting message without a response message. Each character string in the list is in the following format;

<address serial number>, <media stream number>

Furthermore, for a connecting message detection issued through the signal "comht", it is also required that a function for directly describing the address is added for the parameter "cp", i.e., no connecting message is received at one or more addresses within a predetermined period of time.

Furthermore, through auditing, the media gateway controller can further obtain types of connecting message supported by the media gateway.

The above newly added packets relate to a possible implementation scheme and can be adjusted in the condition of complying with the principle of this application. For example, the same instruction contents can alternatively be sent in an H.248 signal by an H3.248 attribute.

A connecting message according to the invention can be used to connect a media stream and to detect connectivity. In other words, the same connecting message can be used to connect and to detect connectivity. An implementing process for connecting a media stream has been described above, where connectivity detection has been described partially, and the following descriptions will focus on an implementing process for connectivity detection.

Connectivity detection in this application refers to detecting availability of a media stream path by transmitting a connecting message along the media stream path. Furthermore, the connectivity detection can also be used to detect bearer connectivity between two network nodes, which is independent of a specific service media stream.

A connecting message can be transmitted and received between two ends of a capability negotiated media stream, or between two ends of a configured or specified media stream. For example, an address for transmitting and receiving a connecting message can be configured between two MGs or other media devices such as SIP/H.323 terminals. At this time, a connecting message is primarily used to detect connectivity of a bearer layer instead of being specified to a media stream channel of a call. The address for transmitting and/or receiving a connecting message can alternatively be specified by the MGC, an SIP UA device and the like through signaling. This needs to extend the H.248/MGCP/SIP/H.323 protocol to issue these instructions.

When failure occurs in a bearer network, a media stream cannot be connected even if call signaling is established successfully. Typically, in an existing connectivity detection mechanism, connectivity failure is reported if it is detected that no media stream is received within a certain period of time. However, there is no media stream sometimes may not be equivalent to non-connectivity of the media stream, because it is possible that there is indeed no media stream interacting between two ends within the period of time, for example, in the case that the VAD is activated.

Figure 4:
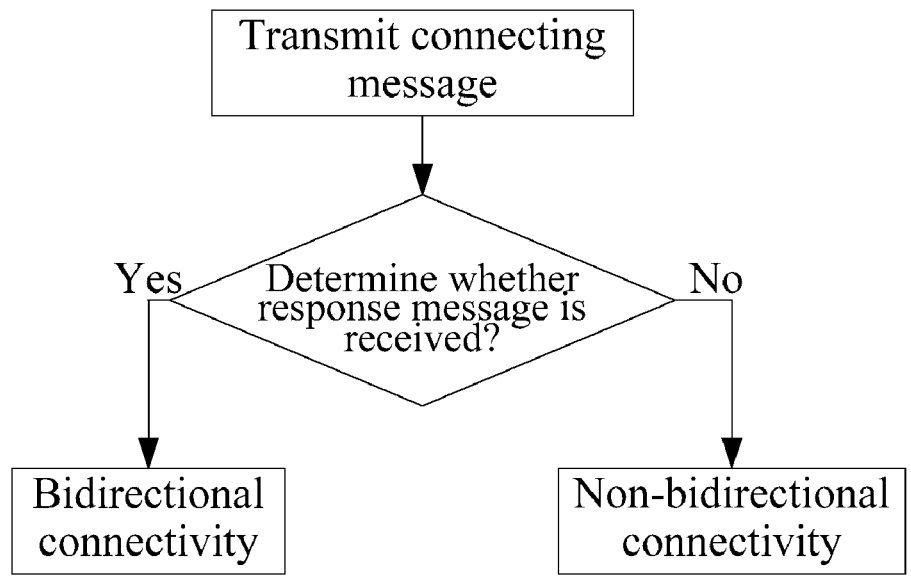
FIG. 4 illustrates a schematic diagram of a flow of the method for detecting connectivity according to a first embodiment of the invention.

Consequently, based on the above method for connecting a media stream through a connecting message, FIG. 4 illustrates a schematic diagram of a flow of a first embodiment of the method for detecting connectivity according to the invention, and the idea of the method is: one of two media devices in a bearer network transmits a connecting message and determines whether a response message for the connecting message is received within a predetermined period of time, and if so, the bearer network where the two media devices are located has bidirectional connectivity, otherwise the bearer network where the two media devices are located has no connectivity. When a connecting message is used for a general connectivity detection of a media bearer layer, the connecting message can be initiated from any party.

The above response may be a response transmitted from the party receiving a connecting message itself, or a loop of the received connecting message by the party receiving the connecting message. In the case of a response being transmitted from the party receiving the connecting message itself, the response can be made as in the event report approach defined above. Alternatively, connecting messages can be transmitted in both directions, and receiving capabilities are detected at each end respectively.

Figure 5:
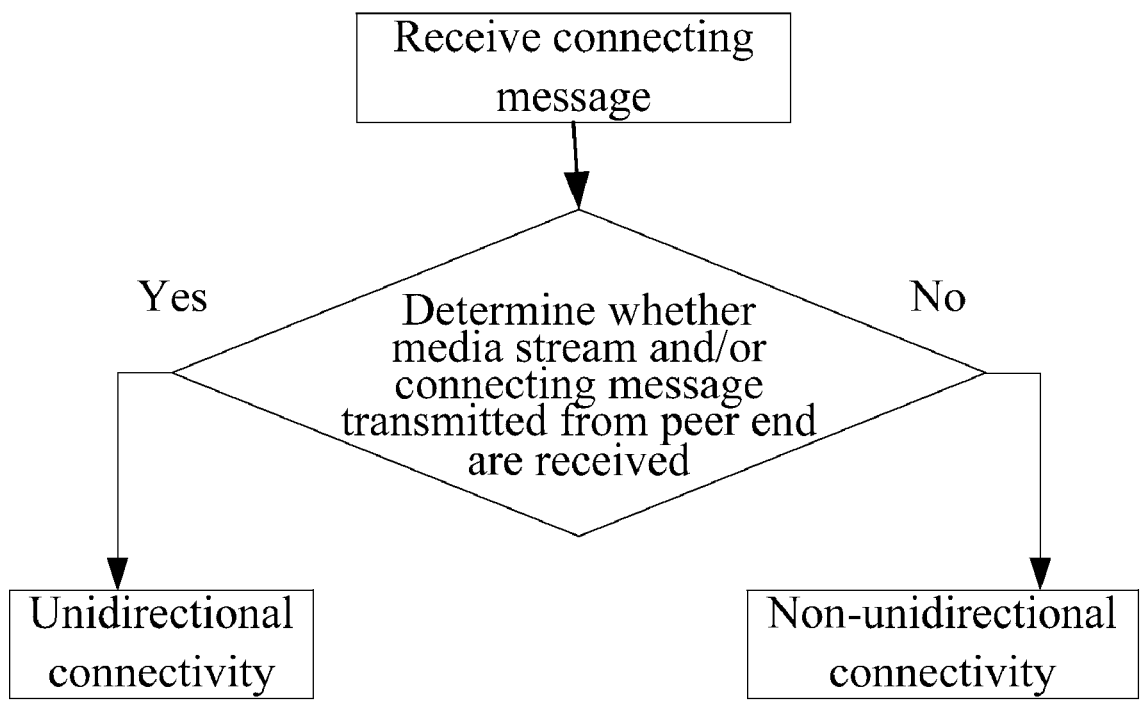
FIG. 5 illustrates a schematic diagram of a flow of the method for detecting connectivity according to a second embodiment of the invention.

Furthermore, similar to FIG. 4, FIG. 5 illustrates a schematic diagram of a flow of a second embodiment of the method for detecting connectivity according to the invention, and the idea of the method is: a media device in a bearer network determines whether a media stream and/or a connecting message transmitted from the peer end to the local end is received within a predetermined period of time, and if so, a bearer network where the peer end is located has unidirectional connectivity to the local end, otherwise the bearer network where the peer end is located has no unidirectional connectivity to the local end. Here, the significance of "and/or" lies in that connectivity can be determined by only detecting a connecting message, or only detecting a media stream, or connectivity is determined if either of the connecting message and the media stream has been detected. Extremely, connectivity can only be determined if both of them have been detected.

The primary difference between FIG. 4 and FIG. 5 lies in that the embodiment illustrated in FIG. 4 can be applied to detecting bidirectional connectivity, and the embodiment illustrated in FIG. 5 can be applied to detecting unidirectional connectivity, i.e., connectivity in the incoming direction. However, for the whole network, if all media devices make detection for unidirectional connectivity, i.e., connectivity in the incoming direction, it is actually implementing bidirectional detection. Therefore, the description of FIG. 4 can be applied to FIG. 5 in this context, except for the difference between unidirectional detection and bidirectional detection.

Because a connecting message can be transmitted repeatedly, it can be used as a heartbeat mechanism for a long-term automatic connectivity detection of a media bearer network. An interval of time between two heartbeats can be fixed or variable. Furthermore, the heartbeat can be temporarily stopped while there is a media stream transmitted in the path. In other words, the heartbeat mechanism can be initiated only if there is no media stream data transmitted for a period of time. Of course, transmitting a connecting message successively is also possible.

The mechanisms for connecting a media stream and for detecting connectivity can also be applied to other media devices, for example, an SIP/H.323 device, and the SIP/H.323 protocol can be extended. By way of an example of the SIP, the SIP protocol can be extended to instruct an SIP device, including an SIP terminal, to transmit and receive a connecting message between two ends of some or all session media streams. An event can be defined for a report when no response is received for a connecting message or when a mapped address is changed. The SIP protocol can be further extended in a way that a heartbeat mechanism for a media bearer can be implemented by an approach of event subscription. Thus, the functions for connecting a media stream and for detecting connectivity can be realized between the SIP/H.323 device and a media gateway.

A connecting message as referred to in this context can be an IP message or another type of message.

The packet "Stunct" and the packet "traffct" introduced above can also be used for detecting connectivity. Similarly, extended MGCP packets can be defined for connecting and for detecting connectivity.

If two ends of a media stream are two different gateways each of which is controlled by an MGC respectively and the SIP protocol is applied between the two MGCs, it is required to extend the SIP protocol to support transmission and detection of a connecting message. For example, the media gateway at one end transmits connecting messages in some media stream paths, and instructs, through SIP signaling, the MGC at the peer end to detect the connecting messages at the peer end of the media streams.

Furthermore, an MGC can also act as an SIP Back-to-Back User Agent (B2BUA), which instructs, through an SIP message, an SIP terminal to transmit a connecting message and to detect connectivity.

Furthermore, an SIP terminal can also notify, through an SIP message, the peer end how the local end transmits a connecting message, and instruct the peer end to detect connectivity.

Therefore, the SIP protocol can be extended as follows:

A header "x-ctreq" is added to instruct the peer end to transmit a connecting message and may also be used to further indicate media stream paths in which the connecting message is transmitted. For description of a connecting message path, reference can be made to the definition of the parameter "fa" in the signal "scp" of the H.248 as mentioned above. Furthermore, a period at which to a connecting message is transmitted can be set. The header can also be used in an SIP message between two MGCs.

A header "x-ctsend" is added to notify the peer end that a connecting message has been transmitted by the local end and may also be used to further indicate media stream paths in which the connecting message is transmitted and the type of the transmitted connecting message. A response for a received connecting message can also act as a connecting message. For description of a connecting message path, reference can be made to the definition of the parameter "fa" in the signal "scp" of the H.248 as mentioned above. Furthermore, information of a period at which a connecting message is transmitted can be carried. The peer end can know from the information that the connecting message is detect at which addresses. The header can also be used for an SIP message between two MGCs.

An event subscription is added for an SIP terminal to detect connectivity and report a connectivity failure event. Connectivity failure involves two cases: in one case, no IP connecting message, or a response for an IP connecting message, or media stream data and the like is received within a predetermined period of time, and non-connectivity of an incoming path is discovered and reported; and in another case, when an STUN binding request message is used as a connecting message, an event is required to be reported if a mapped address returned in a response message is changed. If the source address of a connecting message or the source address of a response message is changed, a report can also be defined.

An application scenario of the H.323 is similar to that of the SIP as described above, therefore the H.323 can also be similarly extended to implement the functions of transmitting a connecting message and detecting connectivity.

Embodiments of the invention further provide a system for connecting a media stream and a system for detecting connectivity, which will be detailed below.

An embodiment of the system for connecting a media stream according to the invention includes a device in a private network, a network address translation device and the peer end of the device in the private network. Specifically, the device in the private network and the peer end device each include a connecting unit adapted to transmit a connecting message to the opposite party through the network address translation device;

the network address translation device further includes a keeping-alive unit adapted to keep alive, according to the transmitted connecting message, an address mapping; and the peer end device further includes a media stream transmitting unit adapted to transmit, according to a media stream path provided by the connecting message, a media stream to the device in the private network through the network address translation device.

The device in the private network may be a media gateway MG or an SIP device or an H.323 device, and the peer end may be a media gateway MG or an SIP device or an H.323 device.

When the device in the private network is an MG, if the MG does not support the STUN protocol, the type of the connecting message includes a media message, a Silence Information Description message, an RTP No-Op message, an RTP packet with an unknown payload type, a UDP packet of 0 byte, or a message in a self-defined format; if the MG supports the STUN protocol, the type of the connecting message includes a media message, a Silence Information Description message, an RTP No-Op message, an RTP packet with an unknown payload type, a UDP packet of 0 byte, a message in a self-defined format, or an STUN binding request. The connecting message in the self-defined format contains information of the media type of the media stream path through which the connecting message passes.

The peer end device further includes a responding unit adapted to return a response message upon reception of the connecting message.

The peer end device and the device in the private network each further includes an abnormality report unit adapted to report abnormality when no response message for the transmitted connecting message is received within a predetermined period of time.

The peer end device and the device in the private network each further includes a bidirectional connectivity determining unit adapted to determine bidirectional connectivity between the device in the private network and a bearer network where the peer end is located after the response message for the connecting message is received within the predetermined period of time, otherwise determine non-bidirectional connectivity between the device in the private network and the bearer network where the peer end is located.

The peer end device and the device in the private network each further includes a unidirectional connectivity determining unit adapted to determine connectivity in the direction from the device at the transmitting end of the connecting message to the device at the receiving end of the connecting message after the device at the receiving end of the connecting message has received the connecting message and/or the media stream transmitted from the transmitting end of the connecting message, otherwise determine non-connectivity in the direction from the device at the transmitting end of the connecting message to the device at the receiving end of the connecting message.

The embodiment of the system for connecting a media stream according to the invention connects a media stream in an operating process similar to the above-described process of the method for connecting a media stream, and repeated descriptions are omitted here.

A first embodiment of the system for detecting connectivity according to the invention includes two media devices in a bearer network, each of which includes a bidirectional connectivity detecting unit adapted to determine bidirectional connectivity of the bearer network where the two media devices are located if a response message for a connecting message transmitted from one media device to another media device in the bearer network is received within a predetermined period of time, and to determine non-bidirectional connectivity of the bearer network where the media devices are located if no response message for the connecting message is received within the predetermined period of time.

The source address and the destination address of the connecting message are the source address and the destination address of the transmitted media stream.

Particularly, the connectivity detecting unit is further adapted to determine bidirectional connectivity of a media path between the source address and the destination address if the media device at the transmitting end of the connecting message has received the response message for the connecting message within the predetermined period of time, otherwise determine non-bidirectional connectivity of the media path between the source address and the destination address.

The media devices each further includes an abnormality reporting unit adapted to report abnormality when no response message is received within the predetermined period of time.

The first embodiment of the system for detecting connectivity according to the invention detects in an operating process similar to the above-described process of the first embodiment of the method for detecting connectivity, and repeated descriptions are omitted here.

A second embodiment of the system for detecting connectivity according to the invention includes a media device in a bearer network, which includes a unidirectional connectivity detecting unit adapted to determine connectivity in the direction from the peer end to the media device if the media device in the bearer network has received a media stream and/or a connecting message transmitted from the peer end within a predetermined period of time, otherwise determine non-connectivity in the direction from the peer end to the media device.

The source address and the destination address of the connecting message are the source address and the destination address of the transmitted media stream.

The connectivity detecting unit is further adapted to determine connectivity of a path between the source address and the destination address if the media stream and/or the connecting message transmitted from the destination address of the peer end are received within the predetermined period of time, otherwise determine non-connectivity of the path between the source address and the destination.

The media device further includes an abnormality reporting unit adapted to report abnormality when no response message is received within the predetermined period of time.

The second embodiment of the system for detecting connectivity according to the invention detects in an operating process similar to the above-described process of the second embodiment of the method for detecting connectivity, and repeated descriptions are omitted here.

As can be apparent from the foregoing descriptions of the embodiments of the invention, the method for connecting a media stream according to the embodiments of the invention can be applied in a way that the device in the private network and the peer end device can unidirectionally or bidirectionally transmit a connecting message through the network address translation device, and the connecting message can generate an address mapping in the network address translation device, so that a media stream transmitted from the peer end of the device in the private network can be transmitted to the media device in the private network by using the address mapping as a transmitting path, thereby avoiding the limitation that the media device in the private network has to initiate transmission of a media stream to the peer end, and address mappings in the NA(P)T and the TURN server can be kept alive. The method for detecting connectivity according to the embodiment of the invention can be applied to detect bidirectional connectivity of a bearer network in a way that it is determined whether a media device in the bearer network has received a response message for a connecting message transmitted from another media device within a predetermined period of time, and if so, it indicates bidirectional connectivity between the two media devices in the bearer network. The method for detecting connectivity according to the embodiment of the invention can be applied to detect unidirectional connectivity of a bearer network in a way that it can be determined whether a media device in the bearer network has received a media stream and/or a connecting message transmitted from the peer end within a predetermined period of time, and if so, it indicates connectivity in the direction from the peer end to the media device.

The foregoing descriptions are merely illustrative of the preferred embodiments of the invention but are not intended to limit the scope of the invention. Any modifications, equivalent substitutions, adaptations and the like, made without departing from the spirit and scope of the invention fall within the scope of the invention as defined in the appended claims.

What is claimed is:

1. A method for connecting a media stream, comprising:
transmitting, by a media gateway in a private network, a connecting message to an external network device through a network address translation device according to an instruction from a media gateway controller, wherein the instruction is used for specifying local media address being required to transmit the connecting message; and
receiving, by the network address translation device, the connecting message, wherein the connecting message is used for generating a new address mapping, the new address mapping is used for a subsequent media stream passing through the network address translation device, when there is no address mapping available in the network address translation device, and is used for keeping alive the address mapping when the address mapping is already available in the network address translation device.

2. The method according to claim 1, wherein the instruction from the media gateway controller further comprises a type of the connecting message.

3. The method according to claim 1, further comprising:
returning, by the external network device, a response message to the media gateway in the private network through the network address translation device, wherein an abnormality is reported when the media gateway in the private network receives no response message returned from the external network device within a predetermined period of time.

4. The method according to claim 1, further comprising:
reporting abnormality when a receiving end of the connecting message receives no connecting message transmitted from a transmitting end of the connecting message within a predetermined period of time.

5. The method according to claim 1, further comprising:
determining a bidirectional connectivity of a network path in a bearer network, where the media gateway and the external network device are located, when a response message in response to the connecting message is received within the predetermined period of time.

6. The method according to claim 1, further comprising:
detecting whether a media gateway in a bearer network has received at least a media stream and a connecting message transmitted from a peer end within a predetermined period of time;
determining a connectivity in a direction from the peer end to the media device, if at least one of the media stream and the connecting message are received within the predetermined period of time; and
determining a non-connectivity in the direction from the peer end to the media device, if the media stream and the connecting message are not received within the predetermined period of time.

7. The method according to claim 1, wherein the instruction comprises a parameter which is defined as a list of character strings and each item in the list takes the following values:
L: "Local Address", which indicates transmission from a local address;
N: "No Request", which indicates that the local address with the serial number is not required to transmit the connecting message.

8. The method according to claim 1, wherein the instruction from the media gateway controller comprises a parameter which is a list of character strings, and each line of the list is in the following format:
<address serial number>, <media stream number>.

9. A communication system, comprising a media gateway in a private network, a network address translation device, and a media gateway controller, wherein:
the media gateway controller is adapted to send an instruction to the media gateway, wherein the instruction comprises a local media address required to transmit a connecting message;
the media gateway is adapted to transmit the connecting message to an external network device through the network address translation device according to the instruction from the media gateway controller; and
the network address translation device is adapted to receive the connecting message, wherein the connecting message is adapted to generate an address mapping which is used for a subsequent media stream to pass through the network address translation device, in the network address translation device when there is no address mapping available in the network address translation device.

10. The system according to claim 9, wherein the instruction from the media gateway controller comprises a type of the connecting message.

11. The system according to claim 9, wherein the instruction from the media gateway controller comprises a parameter which is defined as a list of character strings and each item in the list takes the following values:

L: "Local Address", which indicates transmission from a local address;

N: "No Request", which indicates that the local address with the serial number is not required to transmit the connecting message.

12. The system according to claim 9, wherein the media gateway is further adapted to transmit a connecting message, if no transmission or reception of any media stream is performed for the address mapping during a predetermined period of time, in order to prevent the address mapping from being deleted due to time-out.

13. The system according to claim 9, wherein the media gateway is further adapted to:
report abnormality when a source address of the connecting message transmitted from the media gateway in the private network or a source address of a response message for the connecting message is changed.

14. The system according to claim 9, wherein the media gateway is further adapted to:
determine bidirectional connectivity of a network path in a bearer network in which the media gateway and the external network device are located, when a response message for the connecting message is received within the predetermined period of time.

15. The system according to claim 9, wherein the external network device is further adapted to:
transmit a connecting message to the media gateway in the private network through the network address translation device.

16. The system according to claim 15, wherein the external network device is further adapted to report abnormality when no response message for the transmitted connecting message is received within a predetermined period of time.

17. The system according to claim 9, wherein the instruction from the media gateway controller comprises a parameter which is a list of character strings, and each line of the list is in the following format:
<address serial number>, <media stream number>.

18. A media gateway, adapted to:
receive an instruction which comprises a local media address required to transmit a connecting message, from a media gateway controller;
generate the connecting message; and
transmit the connecting message to an external network device through a network address translation device.

19. The media gateway according to claim 18, wherein the instruction from the media gateway controller comprises a parameter which is defined as a list of character strings and each item in the list takes the following values:
L: "Local Address", which indicates transmission from a local address;
N: "No Request", which indicates that the local address with the serial number is not required to transmit the connecting message.

20. The media gateway according to claim 18, wherein the instruction from the media gateway controller comprises a parameter which is a list of character strings, and each line of the list is in the following format:
<address serial number>, <media stream number>.

21. A method for connecting a media stream, comprising:
transmitting, by a media gateway in a private network, a connecting message to an external network device through a network address translation device according to an instruction from a media gateway controller, wherein the instruction comprises a local media address being required to transmit the connecting message; and
receiving, by the network address translation device, the connecting message, wherein the connecting message is configured to generate an address mapping, the address mapping is used for a subsequent media stream passing through the network address translation device.

22. The method according to claim 21, wherein the instruction comprises a parameter which is defined as a list of character strings and each item in the list takes the following values:
L: "Local Address", which indicates transmission from a local address;
N: "No Request", which indicates that the local address with the serial number is not required to transmit the connecting message.

23. The method according to claim 21, wherein the instruction from the media gateway controller_comprises a type of the connecting message, the type comprises at least one of the following type: (Real-time Transport Control Protocol) RTCP packet, (Simple Traversal of UDP Through Network Address Translators) STUN packet, Real-time Transport Protocol (RTP) packet and empty RTP packet.

* * * * *

UNITED STATES PATENT AND TRADEMARK OFFICE
CERTIFICATE OF CORRECTION

PATENT NO. : 7,885,278 B2  
APPLICATION NO. : 12/362270  
DATED : February 8, 2011  
INVENTOR(S) : Ning Zhu Page 1 of 1

It is certified that error appears in the above-identified patent and that said Letters Patent is hereby corrected as shown below:

Column 26, line 38, "controller_comprises" should read --controller comprises--.

Signed and Sealed this
Fifth Day of April, 2011

David J. Kappos
*Director of the United States Patent and Trademark Office*